(12) United States Patent
Sakai (10) Patent No.: US 8,390,908 B2
(45) Date of Patent: *Mar. 5, 2013

(54) OPTICAL SCANNING APPARATUS, AND IMAGE FORMING APPARATUS

(75) Inventor: Kohji Sakai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 608 days.

This patent is subject to a terminal disclaimer.

(21) Appl. No.: 12/219,529

(22) Filed: Jul. 23, 2008

(65) Prior Publication Data

US 2009/0059333 A1   Mar. 5, 2009

(30) Foreign Application Priority Data

Aug. 30, 2007  (JP) ................................. 2007-224733

(51) Int. Cl.
  *G02B 5/18*  (2006.01)
  *G02B 26/08* (2006.01)
(52) U.S. Cl. ............... 359/196.1; 359/512; 359/570; 359/574; 347/257
(58) Field of Classification Search ............... 359/196.1, 359/197.1, 201.1, 201.2, 205.1, 212.1, 395, 359/512, 566, 569, 570, 574–576, 820, 896; 347/224–228, 242, 243, 246, 247, 257, 262
See application file for complete search history.

(56) References Cited

U.S. PATENT DOCUMENTS

| | | | | |
|---|---|---|---|---|
| 5,064,260 A | * | 11/1991 | Shiraishi ............ | 359/205.1 |
| 5,196,957 A | * | 3/1993 | Brueggemann ........ | 359/206.1 |
| 5,285,314 A | * | 2/1994 | Futhey ............ | 359/565 |
| 5,589,982 A | * | 12/1996 | Faklis et al. ............ | 359/565 |
| 6,469,818 B1 | * | 10/2002 | Kato ............ | 359/204.1 |
| 6,650,412 B1 | * | 11/2003 | Slater ............ | 356/328 |
| 7,136,227 B2 | * | 11/2006 | Li ............ | 359/573 |
| 7,450,142 B2 | * | 11/2008 | Nakatsu ............ | 347/242 |
| 7,538,946 B2 | * | 5/2009 | Smith et al. ............ | 359/569 |
| 7,649,663 B2 | * | 1/2010 | Shiraishi ............ | 359/204.1 |
| 2007/0097474 A1 | * | 5/2007 | Amada et al. ............ | 359/204 |
| 2007/0285781 A1 | * | 12/2007 | Seki et al. ............ | 359/566 |

FOREIGN PATENT DOCUMENTS

| | | | |
|---|---|---|---|
| EP | 468410 A1 | * | 1/1992 |
| JP | 60181701 A | * | 9/1985 |
| JP | 2004-280056 | | 10/2004 |
| JP | 2006-98737 | | 4/2006 |
| JP | 2006-154701 | | 6/2006 |
| JP | 2006-235069 | | 9/2006 |
| JP | 2007-11113 | | 1/2007 |

* cited by examiner

*Primary Examiner* — Frank Font
(74) *Attorney, Agent, or Firm* — Dickstein Shapiro LLP (57) ABSTRACT

An optical scanning apparatus includes a semiconductor laser and a first optical element that are fixed on a single continuous member. A second optical element, which is a diffraction optical element, has a diffracting surface in which a plurality of elliptical grooves is formed and which includes a diffracting portion power such that a change in the beam waist position in a main scan direction and a sub-scan direction due to temperature variation in the optical scanning apparatus becomes substantially zero. The member on which the semiconductor laser and the first optical element are fixed has a linear coefficient of expansion such that the change in the beam waist position becomes substantially zero even when there is temperature variation.

11 Claims, 6 Drawing Sheets

OPTICAL SCANNING APPARATUS, AND IMAGE FORMING APPARATUS

BACKGROUND OF THE INVENTION

1. Field of the Invention

The present invention generally relates to optical scanning apparatuses for forming a latent image on an image carrier, and image forming apparatuses, such as copiers, printers, facsimile machines, plotters, and multifunction peripherals, having such an optical scanning apparatus.

2. Description of the Related Art

Optical scanning apparatuses are widely known in connection with image forming apparatuses such as optical printers, digital copiers, and optical plotters. In recent years, there is a demand for an optical scanning apparatus that is more affordable, less subject to the influence of ambient variations, and capable of forming fine-resolution images.

By forming the various lenses used in an optical scanning apparatus with resin material, light weight and cost reduction can be achieved. Further, because a special surface profile, such as an aspheric surface, can be formed easily with resin, improved optical characteristics can be obtained and the number of lenses of which an optical system is composed can be reduced.

Thus, the adoption of resin lenses greatly contributes to the reduction of size, weight, and cost of an optical scanning apparatus. However, it is also well known that a resin lens is subject to ambient changes, particularly a temperature change, as a result of which the shape or refractive index of the lens may vary. Consequently, the optical characteristics of a resin lens, particularly its power, may vary from its design values, resulting in a change in the beam spot size on a scanned surface.

Such a change in the power of a resin lens due to temperature variation occurs inversely between a positive lens and a negative lens. Thus, it is known to employ positive and negative resin lenses in an optical system of an optical scanning apparatus so that the optical characteristics changes produced in the positive and negative resin lenses due to ambient variation can cancel each other out.

Semiconductor lasers, which are generally used as a light source in an optical scanning apparatus, have characteristics such that as the temperature rises, the wavelength of emitted light shifts to the longer wavelength side (wavelength change due to temperature variation). The change in wavelength of the light source causes a characteristics change in the optical system of the optical scanning apparatus due to chromatic aberration. Such characteristics change is also a cause of the beam spot size change.

Thus, in an optical scanning apparatus that includes resin lenses in its optical system and that employs a semiconductor laser as a light source, the optical system needs to be designed by taking into consideration the optical characteristics change associated with a wavelength change in the light source as well as the optical characteristic change associated with temperature variation.

Japanese Laid-Open Patent Application No. 2006-235069 discloses an optical scanning apparatus (laser scan apparatus) in which the optical characteristics change associated with temperature variation and the wavelength change in the light source are taken into consideration, wherein a diffracting surface is adopted to stabilize optical characteristics.

This optical scanning apparatus includes a coupling lens for converting laser light emitted by a laser light source into a desired form, and a cylindrical lens for condensing the light in the vicinity of a deflecting/reflecting surface of an optical deflector only in a sub-scan direction, wherein the cylindrical lens has a concentric diffracting surface and a linear diffracting surface.

In this way, it becomes possible to cancel power changes in the main scan direction and the sub-scan direction caused by temperature variation in the optical scanning apparatus as a whole, so that a stable beam spot size can be obtained at all times.

However, this type of apparatus requires at least two diffracting surfaces. One problem associated with the use of multiple diffracting surfaces is the drop in diffraction efficiency, i.e., a decrease in optical transmission efficiency due to the development of diffracted light other than diffracted light of desired diffraction orders. Such a problem would not occur if the optical element is molded as per its design values; however, in actual molding process, processing variations are inevitable, and so is the decrease in diffraction efficiency. Generally, resin is a poorer transmitter of light than normal glass. If the transmission efficiency of the resin lens additionally decreases due to the drop in diffraction efficiency, a situation may develop where a photoconductor placed on a scanned surface fails to be developed even though the light beam has reached the photoconductor.

The simplest solution is to increase the output of the semiconductor laser. However, this may induce other problems, such as an increase in power consumption and the development of excess heat.

Japanese Laid-Open Patent Applications No. 2006-154701 and 2007-11113 disclose that elliptical grooves are used so that multiple diffracting surfaces can be consolidated in one plane.

In the above Japanese Laid-Open Patent Applications No. 2006-154701 and 2007-11113, the aforementioned problem of the decrease in diffraction efficiency is solved. However, the elliptical grooves are associated with the problem of processability.

Namely, an elliptical shape, as opposed to a circular shape, has a constantly changing partial curvature, which takes a maximum value at the edge of the ellipse on its major axis. Normally, such a planar shape is created by machining a metal mold piece using a tool bit.

Tool bits naturally have finite dimensions due to their strength, lifetime, etc. Thus, when the curvature of an elliptical shape on the metal mold piece is very large, it is possible that the metal mold piece cannot be processed in principle.

Because the greater the curvature of the elliptical shape, the more difficult it becomes to process it, possibly resulting in situations where an existing cutting machine is incapable of performing sufficiently, or processing accuracy decreases, resulting in a decrease in the accuracy of the diffracting surface of the optical element (thereby causing a decrease in diffraction efficiency, deterioration in wavefront aberration, or development of scattered light, for example).

While equipment capable of highly difficult processing could be introduced, this leads to an increase in equipment cost and the optical element manufacturing cost.

Because the curvature of an elliptical shape depends on its ellipticity (minor axis/major axis), processability of a metal mold can be ensured by setting the ellipticity value appropriately.

By thus insuring processability, the accuracy of the diffracting surface of an optical element can be improved, whereby a low-cost and reliable optical element can be realized.

SUMMARY OF THE INVENTION

It is a general object of the present invention to provide an optical scanning apparatus and an image forming apparatus in which the aforementioned problems are eliminated. A more specific object is to provide an optical scanning apparatus using an elliptical diffracting surface in which a beam spot size variation due to temperature variation is reduced and which is capable of performing an optical scan with a stable beam spot size. Another object is to provide an image forming apparatus that uses such an optical scanning apparatus.

Still another object is to enable an optical element for the above apparatuses to be easily formed at low cost without the need to enhance the accuracy of processing an elliptical shape on a diffracting surface adopted in the optical element.

In accordance with a conventional design philosophy regarding the correction of a beam waist position change, correction is made first by adjusting the distance between a semiconductor laser and a coupling lens to some extent, and only later is correction made with the diffraction optical element on an as-needed basis. As a result, the power of a diffracting portion on the diffracting surface in a main scan direction becomes relatively small, so that, when the diffracting portion is formed in an elliptical shape, its ellipticity naturally becomes small.

In other words, the diffraction optical element has thus far been recognized merely as a final correcting and adjusting unit, as discussed in greater detail later with reference to an Example.

In accordance with the present invention, the above conventional design concept is inverted. Specifically, the correction function of a diffraction optical element is actively utilized to correct the beam waist position change, and the ellipticity of an elliptical shape on the diffracting surface is increased, so that the aforementioned advantages (i.e., improvement in the accuracy of the diffracting surface and a cost reduction based on metal mold processability) can be fully exploited.

Thus, in accordance with the present invention, a diffraction optical element having an elliptical diffracting surface is used.

In one aspect, the invention provides an optical scanning apparatus comprising a first optical element configured to convert a light beam from a light source into a light beam having a desired beam form; a second optical element configured to guide the light beam to an optical deflector; and a third optical element configured to focus the light beam deflected by the optical deflector into an optical spot on a scanned surface and configured to scan the scanned surface. The light source and the first optical element are fixed on a single continuous member. The first optical element or the second optical element is a diffraction optical element. The diffraction optical element has a diffracting surface in which a plurality of elliptical grooves is formed. The diffracting surface has a diffracting portion power such that a change in a beam waist position in a main scan direction and in a sub-scan direction due to temperature variation in the optical scanning apparatus becomes substantially zero. The member on which the light source and the first optical element are fixed has a linear coefficient of expansion such that the change in the beam waist position becomes substantially zero even when there is temperature variation.

In a preferred embodiment, the diffraction optical element has an anamorphic refracting surface formed on a surface opposite to the diffracting surface.

In another preferred embodiment, the diffracting surface of the diffraction optical element has multiple steps of which a total power of a diffracting portion power and a refracting portion power is zero.

In another preferred embodiment, the diffraction optical element is the second optical element.

In another preferred embodiment, the second optical element is made of resin.

In yet another preferred embodiment, the first optical element is made of resin.

In a further embodiment, the first optical element is the diffraction optical element. The first optical element includes the function of the second optical element.

In another embodiment, the first optical element has an anamorphic refracting surface on a side opposite to the diffracting surface.

In another embodiment, the diffracting surface of the first optical element has multiple steps of which a total power of a diffracting portion power and a refracting portion power is zero.

In yet another embodiment, the first optical element is made of resin.

In another aspect, the invention provides an image forming apparatus comprising one or more image forming units configured to optically scan a photosensitive image carrier using an optical scan unit in order to form a latent image that is developed by a developing unit into a visible image. The optical scan unit comprises the above optical scanning apparatus.

Because there may be one or more of the image forming unit, a monochrome image may be formed using a single image forming unit, or the image forming apparatus may be configured so that a two-, multi-, or full-color image can be obtained using two or more image forming units. The optical scanning apparatus for performing an optical scan may be provided for each image forming unit. Alternatively, as known from Japanese Laid-Open Patent Application No. 2004-280056, a part of the optical elements, such as an optical deflector or a part of a scanning optical system, may be shared among plural scanning optical systems.

When two or more image forming units are provided, the individual image forming units may be set at different positions with respect to a single image carrier. Alternatively, the individual image forming units may be set for individual image carriers arranged in the horizontal direction, as in a so-called tandem-type color image forming apparatus.

Hereafter, a brief discussion is given of a change in the beam waist position of a light beam focused toward a scanned surface, in response to an ambient change in an optical scanning apparatus whose optical system includes a resin lens.

Possible factors of the shift in beam waist position due to temperature variation include a change in the refractive index of the resin lens as a result of temperature variation, a change in the shape of the resin lens, and a change in the refractive index (chromatic aberration) of the resin lens as a result of a change in the wavelength of the semiconductor laser.

The refractive index of the resin lens decreases as its density decreases due to expansion associated with a temperature rise. As regards the shape of the resin lens, the curvature of the lens surface decreases as the lens expands due to a temperature rise. The emission wavelength of the semiconductor laser is generally shifted toward the longer wavelength side as the temperature increases. As the wavelength shifts to the longer wavelength side, the refractive index of the resin lens generally decreases.

Thus, the resin lens, regardless of whether it is a positive or a negative lens, changes such that the absolute value of its power decreases as the temperature rises. On the other hand, because the absolute value of the power due to a diffracting portion on a diffracting surface, whether it is positive or negative, tends to increase as the wavelength increases because the diffraction angle is proportional to the wavelength.

Therefore, when a composed power of a resin lens in an optical system of an optical scanning apparatus is positive (or negative), it becomes possible, by setting the power of the diffracting portion on the diffracting surface positive (or negative), to cancel a change in power due to temperature variation in the resin lens by a change in power due to temperature variation in the diffracting portion on the diffracting surface.

As used herein the term "diffracting portion" on a diffracting surface is intended to exclude portions such as a substrate on which the diffracting surface may be formed and which, in accordance with the present invention, is not limited to a planar surface but includes a spherical surface and a cylindrical surface, where the substrate also has power.

More specifically, a case is considered in which the ambient temperature rises when the power of a resin lens included in an optical system and the power of a diffracting portion on a diffracting surface are both positive.

In this case, A>0, B>0, C>0, and D<0 (changes away from the optical deflector being positive), wherein:

A is the amount of the beam waist position change due to a change in the refractive index of the resin lens;

B is the amount of the beam waist position change due to a change in the shape of the resin lens;

C is the amount of the beam waist position change due to a change in the refractive index of the resin lens as a result of a change in the emission wavelength of the semiconductor laser;

D is the amount of the beam waist position change due to a change in the power of the diffracting portion on the diffracting surface as a result of a change in the emission wavelength of the semiconductor laser.

The total amount of the beam waist position change as a result of temperature variation is A+B+C−D. Because A through C are determined by the optical system that includes the resin lens, the beam waist position change due to temperature variation can be corrected in a satisfactory manner by setting the power of the diffracting portion on the diffracting surface such that the condition for eliminating the beam waist position change amount, i.e., A+B+C−D=0, is satisfied.

In accordance with the present invention, the ellipticity of an elliptical shape on a diffracting surface is increased, whereby improved metal-mold processability can be obtained, thereby enhancing the accuracy of the diffracting surface and reducing cost.

Because the power of the diffracting surface is set such that the change in the beam waist position in the main scan direction and the sub-scan direction due to temperature variation is made substantially zero, the beam waist position change is effectively corrected in response to temperature variation. Thus, an optical scan can be performed with a constantly stable beam spot size, and an image can be formed stably in an image forming apparatus using the optical scanning apparatus.

BRIEF DESCRIPTION OF THE DRAWINGS

These and other objects, features and advantages of the invention will be apparent to those skilled in the art from the following detailed description of the invention, when read in conjunction with the accompanying drawings in which.

DETAILED DESCRIPTION OF THE PREFERRED EMBODIMENTS

In the following, embodiments of the present invention are described with reference to the drawings.

Figure 1:
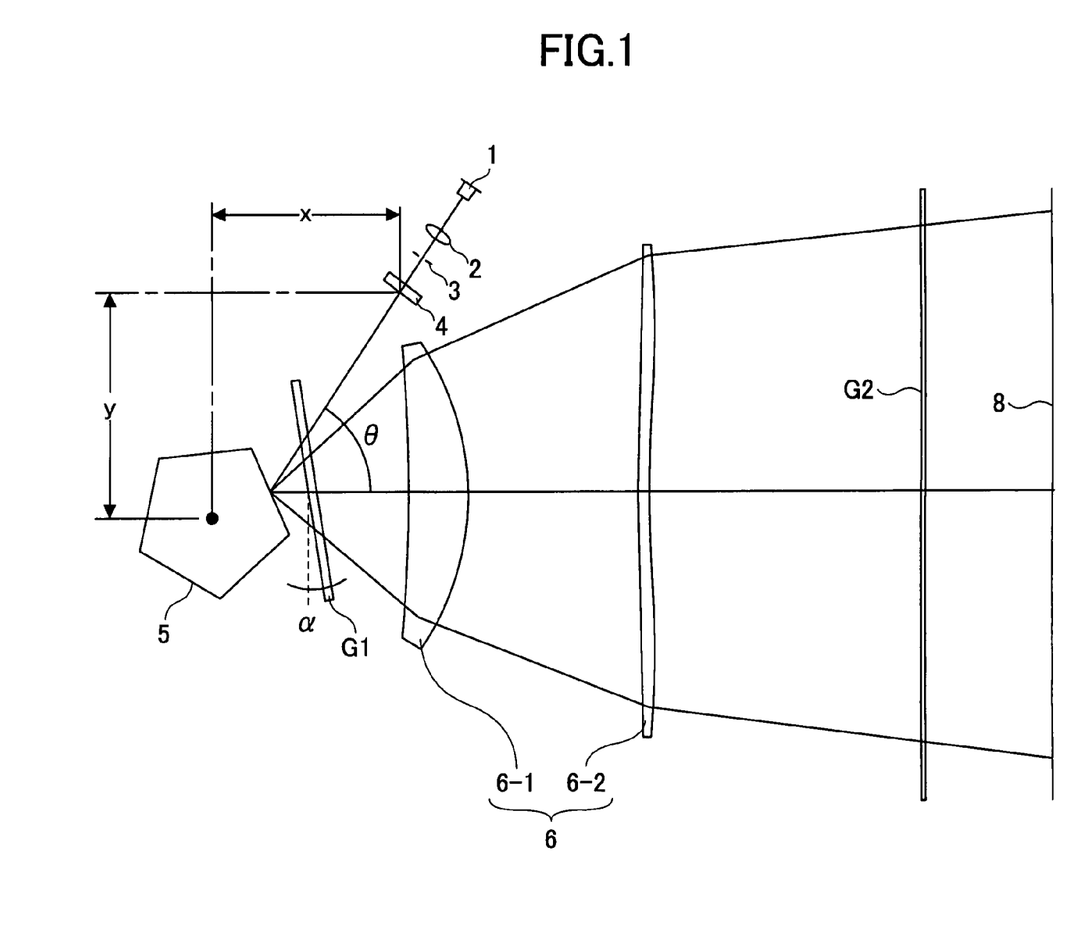
FIG. 1 is a plan view showing an optical arrangement of an optical scanning apparatus according to an embodiment of the invention.

An optical scanning apparatus according to an embodiment of the invention is described with reference to FIGS. 1 through 4. FIG. 1 shows an optical arrangement of the optical scanning apparatus according to the present embodiment.

Numeral 1 designates a semiconductor laser as a light source. Numeral 2 designates a coupling lens as a first optical element. Numeral 3 designates an aperture. Numeral 4 designates an anamorphic optical element as a second optical element. Numeral 5 designates a polygon mirror which is an optical deflector. Numeral 6 designates a scanning optical system as a third optical element. Numeral 8 designates a scanned surface.

The polygon mirror 5 is housed in a soundproof housing (not shown), whose window is enclosed by a soundproof glass G1. A dustproof glass G2 is disposed at a portion of a housing of the optical system of FIG. 1 via which a deflected light beam is emitted.

A divergent light beam emitted by the semiconductor laser 1 is converted by the coupling lens 2 into a substantially parallel light beam. The parallel light beam is shaped by an aperture 3 and is then incident on the anamorphic optical element 4. The light beam that passed through the anamorphic optical element 4 passes through the soundproof glass G1 while converging in the sub-scan direction, forming an image near the deflecting/reflecting surface of the polygon mirror 5, the image extending in the main scan direction. The beam is then reflected by the deflecting/reflecting surface, passes through the dustproof glass G1, and then enters the scanning optical system 6.

The scanning optical system 6 consists of two lenses 6-1 and 6-2. The light beam that passed through the lenses 6-1 and 6-2 is incident on the scanned surface 8 via the dustproof glass G2, forming an optical spot on the scanned surface 8 due to the function of the scanning optical system 6.

As the polygon mirror 5 rotates at constant velocity, the light beam reflected by the deflecting/reflecting surface is deflected at constant angular velocity. The scanning optical system 6 has fθ characteristics such that the optical spot of the incident light beam that is deflected at constant angular velocity moves on the scanned surface in the main scan direction (vertically in FIG. 1) at constant velocity. Thus, the optical spot optically scans the scanned surface 8 at constant velocity.

The scanning optical system 6 also constitutes an anamorphic optical element, and produces a geometrical-optical conjugate relation between the position of the deflecting/reflecting surface of the polygon mirror 5 and the position of the scanned surface 8 in the sub-scanning direction, so that an optical face angle error of the polygon mirror can be corrected. The scanned surface 8 is actually a photosensitive surface of a photosensitive medium.

The anamorphic optical element 4 is an anamorphic resin lens having a concentric power diffracting surface formed on a spherical surface on one side, and a linear power diffracting surface formed on a cylindrical surface on the other side.

In the following, examples relating to the present embodiment are described.

Data concerning the glass material ("glass 1" and "glass 2") and the resin material ("resin") used in the following examples and a comparative example are shown in Table 1.

TABLE 1

Material data

| | Median value | Wavelength hop | Temperature variation | Linear coefficient of expansion |
|---|---|---|---|---|
| Glass 1 | 1.68963 | 1.68959 | 1.68953 | $7.5 \times 10^{-6}$ |
| Glass 2 | 1.51437 | 1.51434 | 1.51429 | $7.5 \times 10^{6}$ |
| Resin 1 | 1.52726 | 1.52723 | 1.52537 | $7.0 \times 10^{-5}$ |

In Table 1, the "median value" indicates the refractive index with respect to a wavelength used at a reference temperature of 25° C. The "temperature variation" indicates the refractive index when the temperature increased from the reference temperature by 20° C. Optical system data subsequent to the optical deflector is shown in Table 2.

TABLE 2

Optical system data subsequent to the optical deflector

| | $R_m$ | $R_s$ | $D_x$ | $D_y$ | n |
|---|---|---|---|---|---|
| Optical deflector (rotation axis) | — | — | 79.75 | 8.8 | — |
| Scan optical system 6-1 | −279.88 | −61.00 | 22.6 | 0 | Resin 1 |
| | −83.58762 | | 75.85 | 0 | — |
| Scan optical system 6-2 | 6950 | 110.91 | 4.9 | 0 | Resin 1 |
| | 765.95 | −68.22 | 158.71 | 0 | — |
| Scanned surface | — | — | — | — | — |

In Table 2, $R_m$ is the paraxial curvature in the main scan direction, $R_s$ is the paraxial curvature in the sub-scan direction, $D_x$ and $D_y$ are each the relative distance between an origin of each optical element to an origin of the next optical element. The unit is in mm.

For example, in the case of $D_x$ and $D_y$ with respect to the optical deflector, the origin on an incident surface of the lens 6-1 in the scanning optical system 6 (position of the optical axis on the incident side), as seen from the rotation axis of the optical deflector (polygon mirror 5), is 79.75 mm away in the optical axis direction (x direction, which is the horizontal direction in FIG. 1) and 8.8 mm away in the main scan direction (y direction, which is the vertical direction in FIG. 1).

The thickness of the lens 6-1 along the optical axis is 22.6 mm, the inter-surface interval of the lenses 6-1 and 6-2 is 75.85 mm, the thickness of the lens 6-2 along the optical axis is 4.9 mm, and the distance between the lens 6-2 and the scanned surface is 158.71 mm. Between the lens 6-2 of the scanning optical system 6 and the scanned surface, there is disposed the dustproof glass G2 made of glass 1 as shown in FIG. 1 and having a thickness of 1.9 mm.

Each surface of the lenses 6-1 and 6-2 of the scanning optical system 6 is aspheric.

The incident-side surface of the lens 6-1 and the incident-side and outgoing-side surfaces of the lens 6-2 have a special surface having a non-circular-arc shape in the main scan direction, which is given by Equation 1, and having a curvature in a sub-scan cross section (virtual cross-section parallel to the optical axis and the sub-scan direction) that varies in the main scan direction in accordance with Equation 2.

The outgoing-side surface of the lens 6-1 is a conjugate aspheric surface expressed by Equation 3.

Non-Circular-Arc Shape

Depth X in the optical axis direction is expressed by the following equation (1):

$$X = \frac{Y^2/R_m}{1+\sqrt{1-(1+K_m)\cdot(Y/R_m)^2}} + A_1 \cdot Y + A_2 \cdot Y^2 + A_3 \cdot Y^3 + A_4 Y^4 + A_5 \cdot Y^5 + A_6 \cdot Y^6 + \ldots \quad (1)$$

where $R_m$ is the paraxial radius of curvature in a main-scan cross section, Y is the distance from the optical axis in the main scan direction, K is a conic constant, and $A_1, A_2, A_3, A_4, A_5, \ldots$ are higher-order coefficients.

Variation in Curvature in the Sub-Scan Cross Section

The variation in curvature $C_s(Y)$ in the sub-scan cross section (Y: coordinate in the main scan direction with respect to the position of the optical axis as an origin) in the main scan direction is expressed by the following equation (2):

$$C_s(Y) = 1/R_s(0) + B_1 \cdot Y + B_2 \cdot Y^2 + B_3 \cdot Y^3 + B_4 \cdot Y^4 + B_5 \cdot Y^5 + B_6 \cdot Y^6 + \quad (2)$$

where $R_s(0)$ is the radius of curvature in the sub-scan cross section including the optical axis, and $B_1, B_2, B_3, \ldots$ are coefficients.

Rotationally Symmetric Aspheric Surface

Depth X in the optical axis direction is expressed by the following equation (3):

$$X = \frac{H^2/R_m}{1+\sqrt{1-(1+K_m)(H/R_m)^2}} + A_1 \cdot H + A_2 \cdot H^2 + A_3 \cdot H^3 + A_4 \cdot H^4 + A_5 \cdot H^5 + A_6 \cdot H^6 + \ldots \quad (3)$$

where R is the paraxial radius of curvature, H is the distance from the optical axis, K is a conic constant, and $A_1, A_2, A_3, A_4, A_5, \ldots$ are higher-order coefficients.

The coefficients of the incident-side surface (special surface) of the lens 6-1 are shown in Table 3.

TABLE 3

| Coefficients in main scan direction | | Coefficients in sub-scan direction | |
|---|---|---|---|
| K | $-2.900 \times 10$ | $B_1$ | $-2.066 \times 10^{-6}$ |
| $A_1$ | 0 | $B_2$ | $5.728 \times 10^{-6}$ |
| $A_2$ | 0 | $B_3$ | $3.152 \times 10^{-8}$ |
| $A_3$ | 0 | $B_4$ | $2.280 \times 10^{-9}$ |
| $A_4$ | $1.756 \times 10^{-7}$ | $B_5$ | $-3.730 \times 10^{-11}$ |
| $A_5$ | 0 | $B_6$ | $-3.283 \times 10^{-12}$ |
| $A_6$ | $-5.492 \times 10^{-11}$ | $B_7$ | $1.766 \times 10^{-14}$ |
| $A_7$ | 0 | $B_8$ | $1.373 \times 10^{-15}$ |
| $A_8$ | $1.088 \times 10^{-14}$ | $B_9$ | $-2.890 \times 10^{-18}$ |
| $A_9$ | 0 | $B_{10}$ | $-1.985 \times 10^{-19}$ |

TABLE 3-continued

| Coefficients in main scan direction | | Coefficients in sub-scan direction | |
|---|---|---|---|
| $A_{10}$ | $-3.183 \times 10^{-19}$ | $B_{11}$ | 0 |
| $A_{11}$ | 0 | $B_{12}$ | 0 |
| $A_{12}$ | $-2.635 \times 10^{-24}$ | $B_{13}$ | 0 |

The coefficients of the outgoing-side surface (coaxial aspheric surface) of the lens 6-1 are shown in Table 4.

TABLE 4

| Coefficients in main scan direction | | Coefficients in sub-scan direction | |
|---|---|---|---|
| K | $-0.549$ | $B_1$ | — |
| $A_1$ | 0 | $B_2$ | — |
| $A_2$ | 0 | $B_3$ | — |
| $A_3$ | 0 | $B_4$ | — |
| $A_4$ | $2.748 \times 10^{-7}$ | $B_5$ | — |
| $A_5$ | 0 | $B_6$ | — |
| $A_6$ | $-4.502 \times 10^{-12}$ | $B_7$ | — |
| $A_7$ | 0 | $B_8$ | — |
| $A_8$ | $-7.366 \times 10^{-15}$ | $B_9$ | — |
| $A_9$ | 0 | $B_{10}$ | — |
| $A_{10}$ | $1.803 \times 10^{-18}$ | $B_{11}$ | — |
| $A_{11}$ | 0 | $B_{12}$ | — |
| $A_{12}$ | $2.728 \times 10^{-23}$ | $B_{13}$ | — |

The coefficients of the incident-side surface (special surface) of the lens 6-2 are shown in Table 5.

TABLE 5

| Coefficients in main scan direction | | Coefficients in sub-scan direction | |
|---|---|---|---|
| K | 0 | $B_1$ | $-9.594 \times 10^{-7}$ |
| $A_1$ | 0 | $B_2$ | $-2.135 \times 10^{-7}$ |
| $A_2$ | 0 | $B_3$ | $-8.080 \times 10^{-12}$ |
| $A_3$ | 0 | $B_4$ | $2.391 \times 10^{-12}$ |
| $A_4$ | $1.550 \times 10^{-8}$ | $B_5$ | $2.881 \times 10^{-14}$ |
| $A_5$ | 0 | $B_6$ | $3.694 \times 10^{-15}$ |
| $A_6$ | $1.293 \times 10^{-14}$ | $B_7$ | $-3.259 \times 10^{-18}$ |
| $A_7$ | 0 | $B_8$ | $1.814 \times 10^{-20}$ |
| $A_8$ | $-8.811 \times 10^{-18}$ | $B_9$ | $8.722 \times 10^{-23}$ |
| $A_9$ | 0 | $B_{10}$ | $-1.341 \times 10^{-23}$ |
| $A_{10}$ | $-9.182 \times 10^{-22}$ | $B_{11}$ | 0 |

The coefficients of the outgoing-side surface (special surface) of the lens 6-2 are shown in Table 6.

TABLE 6

| Coefficients in main scan direction | | Coefficients in sub-scan direction | |
|---|---|---|---|
| K | 5.790 | $B_1$ | 0 |
| $A_1$ | 0 | $B_2$ | $3.644 \times 10^{-7}$ |
| $A_2$ | 0 | $B_3$ | 0 |
| $A_3$ | 0 | $B_4$ | $-4.847 \times 10^{-13}$ |
| $A_4$ | $-1.150 \times 10^{-7}$ | $B_5$ | 0 |
| $A_5$ | 0 | $B_6$ | $-1.666 \times 10^{-16}$ |
| $A_6$ | $1.097 \times 10^{-11}$ | $B_7$ | 0 |
| $A_7$ | 0 | $B_8$ | $4.535 \times 10^{-19}$ |
| $A_8$ | $-6.542 \times 10^{-16}$ | $B_9$ | 0 |
| $A_9$ | 0 | $B_{10}$ | $-2.819 \times 10^{-23}$ |
| $A_{10}$ | $1.984 \times 10^{-20}$ | $B_{11}$ | 0 |
| $A_{11}$ | 0 | $B_{12}$ | 0 |
| $A_{12}$ | $-2.412 \times 10^{-25}$ | $B_{13}$ | 0 |

In the present embodiment, the anamorphic optical element 4 as the second optical element employs a power diffracting surface according to the present invention.

The anamorphic optical element 4 is a resin lens having a diffracting surface on one side in which elliptical grooves are formed in multiple steps where the total power of a diffracting portion power and a refracting portion power is zero. The other side has an anamorphic surface.

Figure 2A:
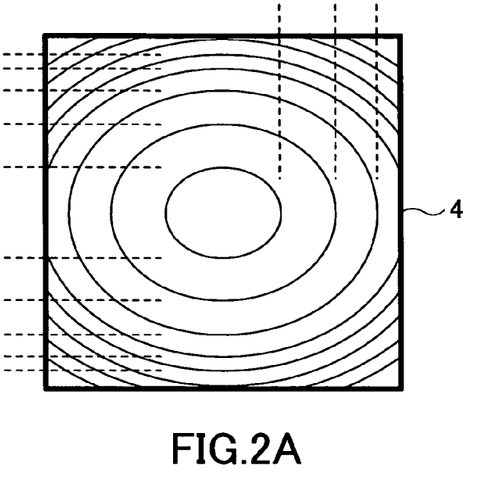
FIG. 2 shows an anamorphic optical element.
Figure 2B:
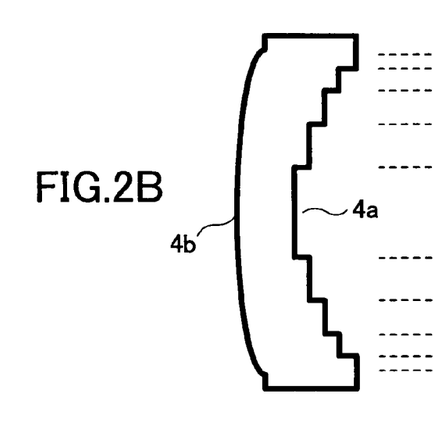
Figure 2C:
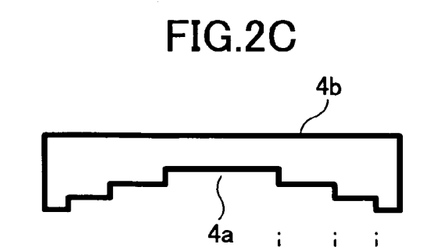

FIG. 2A-2C schematically show the anamorphic optical element 4, in which the horizontal direction corresponds to the main scan direction, and the vertical direction corresponds to the sub-scan direction. In FIG. 2, the anamorphic optical element 4 is as seen from the optical axis direction. On one side, 4a, of the anamorphic optical element, there is the diffracting surface in which elliptical grooves are formed in multiple steps such that a total power of a diffracting portion power and a refracting portion power is zero. On the other side, 4b, there is formed the anamorphic surface as shown.

FIG. 2C above the anamorphic optical element 4 shows an end surface of the anamorphic optical element 4 in a virtual cross section taken parallel to the main scan direction and the optical axis. FIG. 2B on the left shows an end surface of the anamorphic optical element 4 in a virtual cross section parallel to the sub-scan direction and the optical axis. As shown by these end surfaces, one side of the lens has the diffracting surface in which elliptical grooves are formed in multiple steps such that a total power of the diffracting portion power and the refracting portion power is zero, while the other side has the anamorphic surface.

The light beam (parallel light beam) that is incident on the anamorphic optical element 4 from the light source side is rendered into a beam which is parallel to the main scan direction and that converges in the sub-scan direction after passing through the anamorphic optical element 4.

The power of the diffracting surface is set so that the beam waist position change in the main scan direction and the sub-scan direction due to temperature variation become substantially zero.

In the following, the advantages of employing the multiple steps on the diffracting surface are described.

The diffracting surface of which the power is set as described above may generally take various forms. As mentioned above, the formation of a diffracting surface requires highly accurate micromachining technology. Unless a required accuracy is provided, various undesirable problems may occur, such as a decrease in diffraction efficiency, deterioration in wavefront aberration, and the development of scattered light.

In order to ensure the required accuracy, highly accurate measurement technology is also indispensable. However, it is even difficult to measure a diffracting surface having a spherical surface as a basic shape. Thus, it has been difficult to obtain a high-quality diffracting surface.

In accordance with the present embodiment of the invention, the diffracting surface has a stepped-structure and has substantially zero-power. The stepped-structure can be obtained by providing a diffracting portion and a refracting portion on the diffracting surface with powers having equal absolute values and opposite signs. Such a diffracting surface naturally has a stepped-structure. By employing such a structure, the relationship between the diffracting surface and a back cut is substantially right angles anywhere, which makes not just measurement easier but also facilitates processing.

Because the resultant diffracting surface has no power, there is little influence of any inter-surface eccentricity that may exist with respect to the opposite surface, so that the required level of processing accuracy may be less stringent.

The power of a lens can be given as a sum of the power of its incident surface and that of its outgoing surface. Thus, when one side has zero power, a desired lens power can be obtained by setting the power on the other side to an appropriate value. Thus, a diffracting surface with such a stepped-structure can be adopted in lenses of any power.

Because the diffracting surface have no local nonplanar portions, the surface can be finished very smoothly. As a result, there are hardly the problems of the development of scattered light or the increase in beam spot size.

When a diffracting surface with the stepped-structure is used in an optical scanning apparatus in which a multi-beam light source is employed, another advantage is obtained that the shifting in the pitch of scan lines on the scanned surface due to rotation in the optical axis direction by the optical element does not easily occur.

Before describing the examples, a comparative example is described in which no technical concepts according to the present invention are applied. The component elements of an optical system of the comparative example are as follows.

Light Source

A semiconductor laser 1 as a light source has a design emission wavelength of 655 nm. When the temperature increases 1° C. from a reference temperature of 25° C., the emission wavelength shifts to the longer wavelength side by 0.2 nm.

Coupling Lens

A coupling lens 2, which is made of the aforementioned glass 1, is disposed with its front principal point located 27 mm away from the light-emitting portion of the semiconductor laser 1 so that the coupling lens 2 provides a collimating action at a focal distance of 27 mm. The coupling lens 2 has an aspheric surface by which the wavefront aberration of a collimated light beam can be sufficiently corrected.

The semiconductor laser 1 and the coupling lens 2 are fixedly retained on a retaining member made of a material with a linear coefficient of expansion of $2.1 \times 10^{-5}$.

Aperture

An aperture 3 has a rectangular opening measuring 8.14 mm in the main scan direction and 2.96 mm in the sub-scan direction. The aperture 3 shapes the light beam collimated by the coupling lens 2.

Anamorphic Optical Element

An anamorphic optical element 4 has an incident-side surface having a diffracting surface in which elliptical grooves are formed in multiple steps such that a total power of a diffracting portion power and a refracting portion power is zero. On the outgoing-side surface of the anamorphic optical element 4, an anamorphic surface is formed.

The diffracting surface, both in the main scan direction and the sub-scan direction, is expressed by the following quadratic phase function:

$$w = C_y \cdot y^2 + C_z \cdot z^2$$

where Y is the coordinate in the main scan direction with respect to the optical axis as the origin; Z is the coordinate in the sub-scan direction with respect to the optical axis as the origin; and $C_y$ and $C_z$ are coefficients such that hd y=$2.02 \times 10^{-3}$ and $C_z = 1.715 \times 10^{-2}$.

Optical Deflector

The polygon mirror 5, which is the optical deflector, has five reflecting surfaces, and its radius of an inscribed circle is 18 mm. The distance between the outgoing-side surface of the anamorphic optical element 4 and the rotation axis of the polygon mirror 5 is set such that, in the arrangement of FIG. 1, the horizontal distance x=82.97 mm and the vertical distance y=112.77 mm.

The soundproof glass G1 is made of glass 1 and has a thickness of 1.9 mm. Its angle α of inclination with respect to the y direction (i.e., the vertical direction) is 16°.

An angle θ of 58° is formed between the direction of propagation of the light beam incident from the light source side and the direction of propagation of the light beam reflected by the deflecting/reflecting surface onto a position on the scanned surface 8 with an image height of zero.

Table 7 summarizes the above.

TABLE 7

| Optical system data up to the optical deflector | | | | |
|---|---|---|---|---|
| | $R_m$ | $R_s$ | L | n |
| Light source | — | — | 55.74 | — |
| Aperture | — | — | 34.71 | — |
| Anamorphic optical element | ∞ | 65.8 | 3 | Resin 1 |
| | — | — | — | — |
| Optical deflector (rotation axis) | — | — | — | — |

In Table 7, $R_m$ is the radius of curvature in the main scan direction, $R_s$ is the radius of curvature in the sub-scan direction, and L is the surface separation. The unit is in mm.

The amount of change in the beam waist position at 45° C. with respect to the reference temperature of 25° C. is as follows:

Main scan direction: −0.04 mm
Sub-scan direction: 0.11 mm

Figure 6:
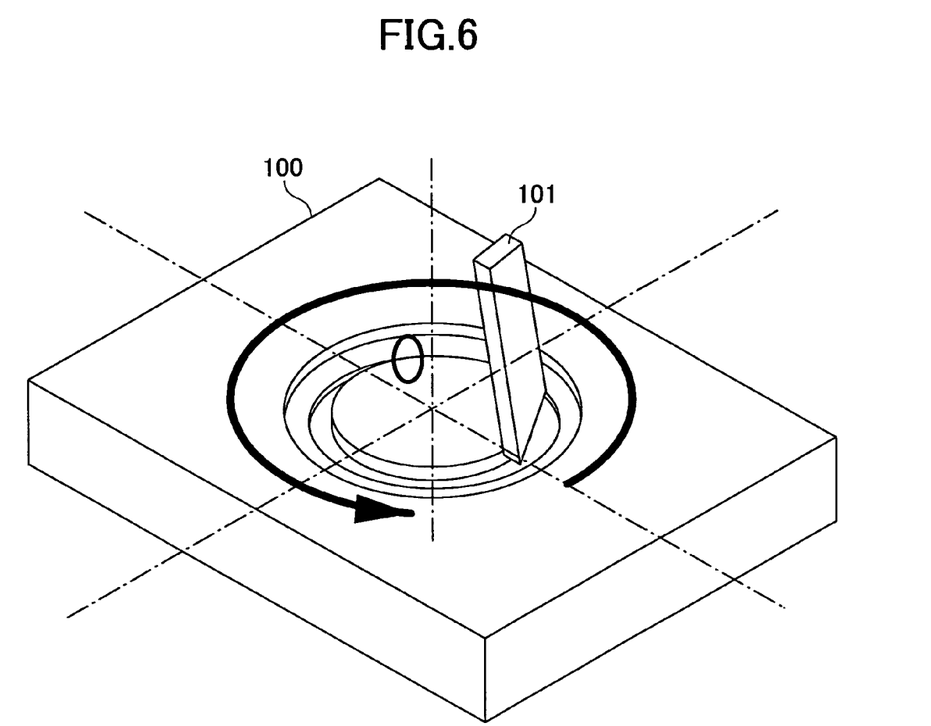
FIG. 6 is a perspective view illustrating how a diffracting surface is processed on a metal mold.

Thus, it can be seen that appropriate corrections are made in both the main scan direction and the sub-scan direction. However, the ellipticity in this case is 0.12. A diffracting surface with such an ellipticity is extremely difficult to process for the following reasons. Generally, a diffracting surface is processed (for the fabrication of a mold) by cutting a metal mold 100 with a tool bit 101 as shown in FIG. 6, in accordance with the design dimensions of the diffracting surface. Into the processed mold, resin or glass is poured to obtain a diffracting surface for an optical element.

Thus, interference from portions of the tool bit 101 other than its cutting edge tends to occur, so that it is necessary to make the tool bit narrower, making it difficult to obtain a required strength of the tool itself.

Furthermore, the processing machine is required to have a high response speed, which easily leads to a tradeoff with accuracy, making it difficult to obtain a required accuracy.

The reason why such a small ellipticity results is generally discussed below.

In normal optics design, the beam waist position change due to temperature variation is considered more in terms of the main scan direction than the sub-scan direction. This is due to the fact that their image-forming lateral magnifications differ by approximately one order of magnitude, and that, because the amount of change in beam waist position is proportional to the square of the magnification, stability of an optical scanning apparatus as a whole can be more easily ensured by designing an optical element by focusing on the main scan direction, which is extremely sensitive to temperature variation.

Among the optical elements of an optical scanning apparatus, one that has the maximum power is the coupling lens as the first optical element. Thus, a change in the distance between a semiconductor laser as the light source and the coupling lens due to temperature variation greatly contributes to the beam waist position change in the main scan direction.

When the temperature increases, the overall power tends to decrease, as mentioned above. A corresponding change in the beam waist position develops away from the optical deflector as seen from the scanned surface. On the other hand, because the interval between the semiconductor laser and the coupling lens increases due to expansion, a corresponding change in the beam waist position develops toward the optical deflector as seen from the scanned surface.

Thus, by appropriately setting the interval between the semiconductor laser and the coupling lens, the change in the beam waist position due to power decrease can be cancelled. This means that the linear coefficient of expansion of the material by which the semiconductor laser and the coupling lens are fixed should be appropriately set.

However, a material with an ideal linear coefficient of expansion does not always exist. If there is, it could be very expensive and impractical. Thus, generally, a practical or general-purpose-type resin material with a close-to-ideal linear coefficient of expansion is used, and the beam waist position change in the main scan direction caused by the difference from the ideal is either disregarded or corrected by introducing a diffracting surface, for example.

As a result, the power of a diffracting portion on a diffracting surface in the main scan direction becomes relatively small, so that, when the diffracting portion is formed in an ellipse, the ellipticity of the diffracting portion naturally becomes small.

In accordance with the present invention, the above design process is reversed. In order to correct the beam waist position change in the main scan direction due to temperature variation, it is only necessary to balance:

(1) the beam waist position change due to a refracting power change in optical elements as a whole of which the optical scanning apparatus is composed;
(2) the beam waist position change due to the expansion or contraction of the interval between the semiconductor laser and the coupling lens; and
(3) the beam waist position change due to a power change in the diffracting portion on the diffracting surface.

Instead of the conventional design process which considers the balance between (1) and (2) first and then attempts to correct their difference by (3), in accordance with the present invention, a shape of the diffracting surface that is easy to process is estimated to some extent, while the factors (1) to (3) are balanced in an overall manner.

In other words, more weight is given to the diffraction optical element as regards the correction of the beam waist position change, in order to avoid the decrease in the ellipticity of the diffracting surface.

In accordance with the present embodiment, a target ellipticity of 0.15 or greater is set in view of actual processing accuracy.

Several examples are described below.

Example 1

The semiconductor laser 1 and the coupling lens 2 are fixedly retained on a retaining member with a linear coefficient of expansion of $1.0\times10^{-5}$.

The coefficients of the diffracting surface of the anamorphic optical element 4 are such that $C_y=2.95\times10^{-3}$ and $C_z=1.747\times10^{-2}$.

The amount of change in the beam waist position at 45° C. with respect to the reference temperature of 25° C. is as follows:
 Main scan direction: −0.03 mm
 Sub-scan direction: −0.13 mm Thus, it can be seen that satisfactory corrections are made in both the main scan direction and the sub-scan direction. The ellipticity is 0.169, so that the diffracting surface can be processed relatively easily.

Such processability leads to an enhanced accuracy in the diffracting surface and contributes to the maintenance of quality of the diffracting function.

The inventive concept of increasing the ellipticity of an elliptical shape on a diffracting surface may be applied regardless of the material of the diffraction optical element (such as glass or resin). When the diffraction optical element is formed of resin, a cost reduction can also be achieved.

In the following, allowable values of the beam waist position change in the present Example are discussed.

Figure 3:
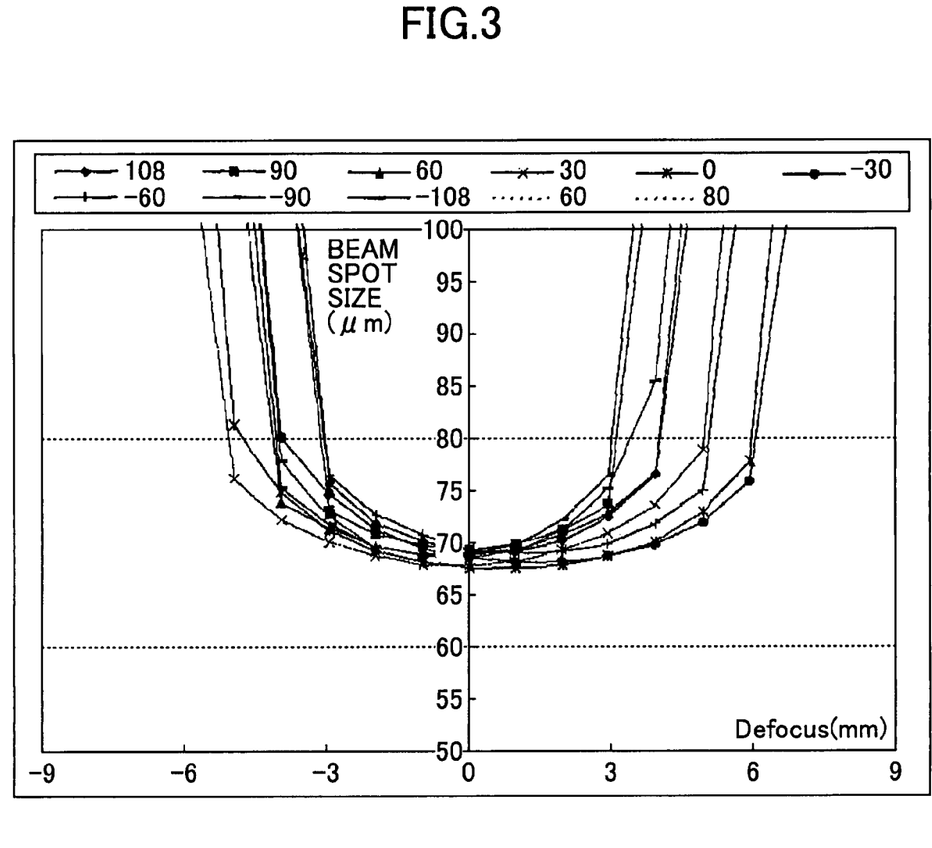
FIG. 3 is a graph for a main scan direction showing the defocus amount on the horizontal axis and the beam spot size on the vertical axis.
Figure 4:
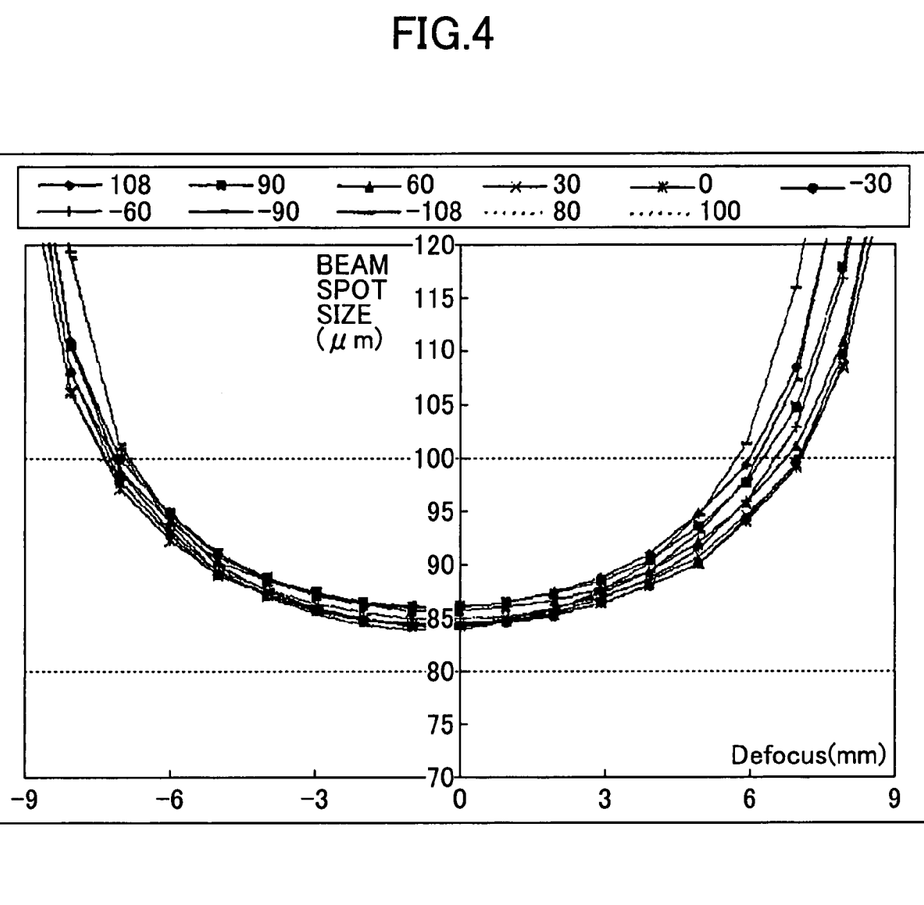
FIG. 4 is a graph for a sub-scan direction showing the defocus amount on the horizontal axis and the beam spot size on the vertical axis.

FIGS. 3 and 4 are graphs showing the defocus amount (amount of displacement from the photoconductor in the optical axis direction) on the horizontal axis and the beam spot size on the vertical axis. FIG. 3 is a graph for the main scan direction, and FIG. 4 is for the sub-scan direction.

The target beam spot size of the present optical system is 70 µm×90 µm. Generally, an allowable amount of variation in beam spot size is on the order of ±10% of the target value. In the present case, the allowable amount is set to be ±10 µm in both the main scan and the sub-scan directions.

Thus, the allowable amount of change in the beam waist position (where the beam spot has a minimum value) is about 6 mm in the main scan direction and about 13.5 mm in the sub-scan direction.

In reality, the beam spot size may increase due to not just the shifting in the beam waist position but also a wave-optical factor based on a disturbance in the wavefront. Thus, the allowable variation amount of the beam waist position is actually smaller.

Factors that cause the beam waist position change can be roughly categorized into the component processing/attachment error, and the temperature variation. The factors due to the component processing/attachment error produce changes on the order of 5 mm in the main scan direction and 8 mm in the sub-scan direction. Naturally, the beam waist position variation can be further reduced by setting a more strict allowable value in each direction; this, however, leads to an increase in cost.

Thus, the allowable amount of the beam waist position change due to temperature variation is 1 mm or smaller in the main scan direction and 6.5 mm or smaller in the sub-scan direction. Based on these values, the appropriateness of correction of the beam waist position change amounts is determined (also in comparative examples).

Although these allowable values may seem unexpectedly large, the lateral magnification in the sub-scan direction tends to increase, particularly in a type where a scanning optical system is composed of a single lens, and the amount of change in the beam waist position due to temperature variation in the sub-scan direction is quite large. For example, in the present Example, if the diffraction optical element were to be replaced by a conventional glass lens, the amount of change in the beam waist position would be about 1 mm in the main scan direction and about 12 mm in the sub-scan direction, so that the beam spot size would already be in error.

Conversely, by minimizing the beam waist position change amount due to temperature variation, the component processing/attachment error may be tolerated all the more, thus resulting in a productivity improvement.

Example 2

The semiconductor laser 1 and the coupling lens 2 are fixedly retained on a retaining member with a linear coefficient of expansion of $5.0\times10^{-6}$.

The coefficients of the diffracting surface of the anamorphic optical element 4 are such that $C_y=3.38\times10^{-3}$ and $C_z=1.758\times10^{-2}$.

The amount of the beam waist position change at 45° C. with respect to the reference temperature of 25° C. is as follows:

Main scan direction: −0.03 mm

Sub-scan direction: 0.1 mm

Thus, it can be seen that satisfactory corrections are made in both the main scan direction and the sub-scan direction. The ellipticity in this case is 0.192, so that processing is easier than in the case of Example 1.

Example 3

The ellipticity can be increased merely by making the coupling lens with resin.

Specifically, in this example, resin 1 shown in Table 1 is used as the material for the coupling lens. The coupling lens is disposed such that its front principal point is located 35.06 mm away from the light-emitting portion of the semiconductor laser 1, so that a collimating action is obtained at the focal distance of 35.06 mm. The semiconductor laser 1 and the coupling lens 2 are fixedly retained on a retaining member with a linear coefficient of expansion of $5.0\times10^{-5}$.

The coefficients of the diffracting surface of the anamorphic optical element 4 are such that $C_y=7.8\times10^{-3}$ and $C_z=1.55\times10^{-2}$.

The amount of the beam waist position change at 45° C. with respect to the reference temperature of 25° C. is as follows:

Main scan direction: 0.02 mm

Sub-scan direction: 0.1 mm

Thus, it can be seen that satisfactory corrections are made in both the main scan direction and the sub-scan direction. The ellipticity in this case is 0.5, so that processing is easier than in the case of Example 2.

Example 4

Example 4 is similar to Example 3 with the exception that the retaining member has a linear coefficient of expansion of $5.0\times10^{-6}$.

The coefficients of the diffracting surface of the anamorphic optical element 4 are such that $C_y=9.35\times10^{-3}$ and $C_z=1.71\times10^{-2}$.

The amount of the beam waist position change at 45° C. with respect to the reference temperature of 25° C. is as follows:

Main scan direction: −0.03 mm

Sub-scan direction: 0.04 mm

Thus, it can be seen that satisfactory corrections are made in both the main scan direction and the sub-scan direction. The ellipticity in this case is 0.55, so that processing is easier than in the case of Example 3.

Example 5

While the foregoing examples involve an optical scanning apparatus in which the first optical element and the second optical element are considered independent from each other, these two optical elements may be integrated. Such an integrated optical element converts the divergent light beam emitted by the semiconductor laser into a light beam substantially parallel in the main scan direction. In the sub-scan direction, the light beam passes through the soundproof glass G1 and is focused near the deflecting/reflecting surface of the polygon mirror 5, forming a line image that extends in the main scan direction.

In this case, the integrated element may be formed with resin.

Figure 5:
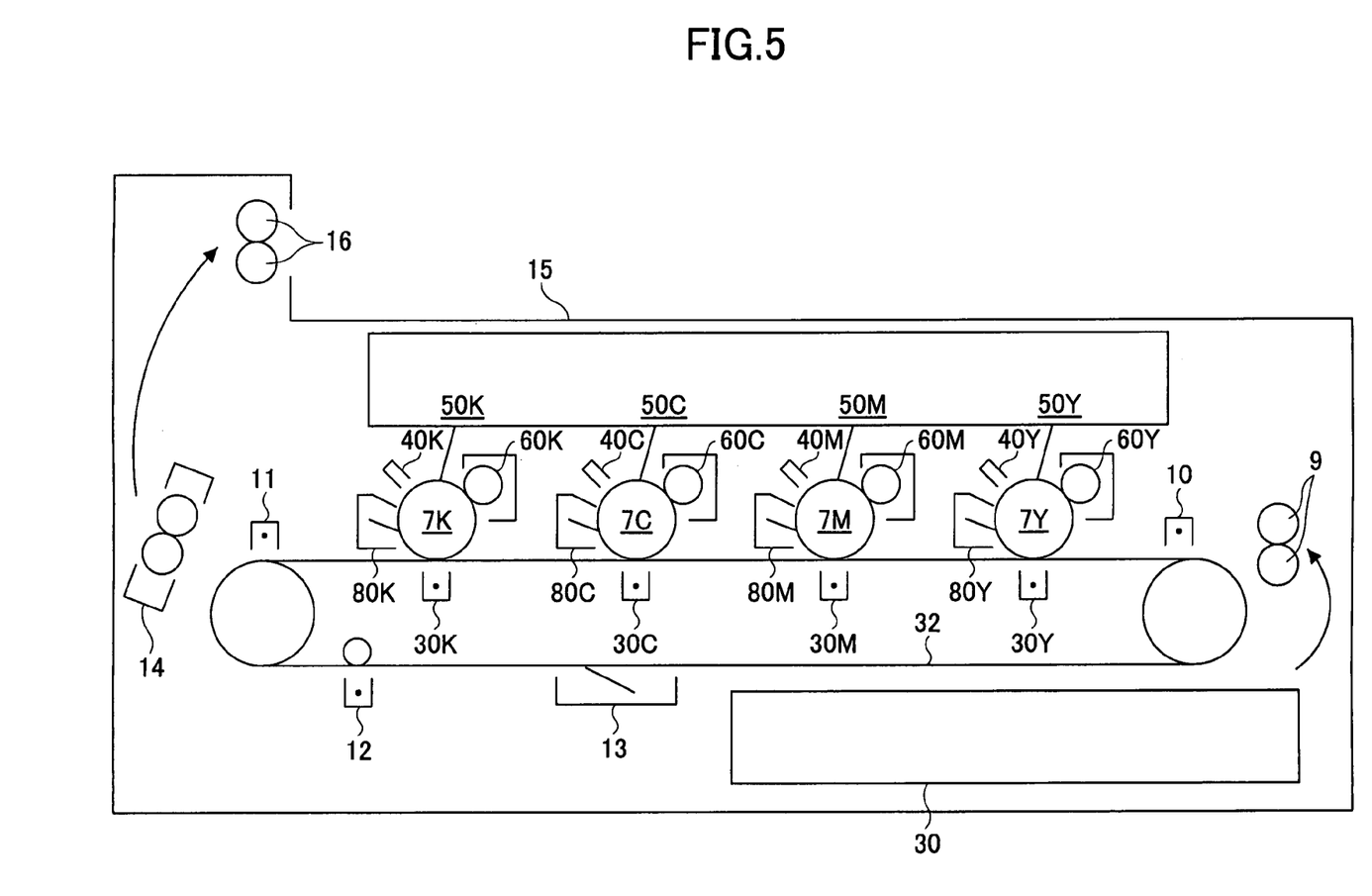
FIG. 5 schematically shows an image forming apparatus according to an embodiment of the invention.

FIG. 5 shows an image forming apparatus according to a second embodiment of the invention having the above optical scanning apparatus.

The image forming apparatus is a tandem full-color optical printer.

In a bottom portion of the apparatus, there is disposed a transport belt 32 for transporting a transfer sheet (not shown) supplied from a paper feed cassette 30 disposed horizontally.

Over the transport belt 32, there are disposed plural image carriers, i.e., a photoconductor 7Y for yellow, a photoconductor 7M for magenta, a photoconductor 7C for cyan, and a photoconductor 7K for black, at equal intervals successively from an upstream side. In the following, the colors of yellow, magenta, cyan, and black are denoted by Y, M, C, K, respectively.

The photoconductors 7Y, 7M, 7C, and 7K are formed with an identical size. Process members are successively disposed around each of the photoconductors 7Y, 7M, 7C, and 7K in accordance with an electrophotographic process. For example, the photoconductor 7Y is surrounded by a charger 40Y, an optical scanning apparatus 50Y, a developing device 60Y, a transfer charger 30Y, and a cleaning device 80Y successively. The other photoconductors 3M, 3C, and 3K are similarly configured.

Thus, in this image forming apparatus, the photoconductors 7Y, 7M, 7C, and 7K provides the scanned surfaces for individual colors and are associated with optical scanning apparatuses 50Y, 50M, 50C, and 50K, respectively.

These optical scanning apparatuses 50Y, 50M, 50C, and 50K may employ the optical arrangement as shown in FIG. 1 independently. Alternatively, the optical scanning apparatuses 50Y, 50M, 50C, and 50K may share an optical deflector (polygon mirror) in a manner known from Japanese Laid-Open Patent Application No. 2004-280056, for example, and the lens 6-1 in the scanning optical system of each optical scanning apparatus may be shared for the optical scan of the photoconductors 7M and 7Y and for the optical scan of the photoconductors 7K and 7C.

Around the transport belt 32, a resist roller pair 9 and a belt charger 10 are disposed upstream of the photoconductor 7Y. Downstream of the photoconductor 7K, there are disposed a belt separating charger 11, a neutralizing charger 12, and a cleaning device 13, for example. Further downstream of the belt separating charger 11 along the transport direction, there is disposed a fixing device 14, from which the transport path further extends to the ejected paper tray 15 via ejection rollers 16.

In this configuration, in a full-color mode, for example, an electrostatic latent image is formed on each of the photoconductors 7Y, 7M, 7C, and 7K by an optical scan performed by each of the optical scanning apparatuses 50Y, 50M, 50C, and 50K based on an image signal for the individual color Y, M, C, and K. Each of the electrostatic latent images is developed with the toner of a corresponding color into a toner image. The toner images for the individual colors are successively transferred and overlaid on the transfer sheet as it is transported by being electrostatically adsorbed onto the transport belt 32. After the full-color image is fixed by the fixing device 14, the printed transfer sheet is ejected onto the ejected paper tray 15.

By equipping the image forming apparatus with the optical scanning apparatus as described with reference to the Examples, a constantly stable beam spot size can be obtained, whereby an image forming apparatus suitable for fine-resolution printing can be realized in a compact size and at low cost.

Although this invention has been described in detail with reference to certain embodiments, variations and modifications exist within the scope and spirit of the invention as described and defined in the following claims.

The present application is based on the Japanese Priority Application No. 2007-224733 filed Aug. 30, 2007, the entire contents of which are hereby incorporated by reference.

What is claimed is:

1. An optical scanning apparatus comprising:
  a first optical element configured to convert a light beam from a semiconductor laser light source into a light beam having a desired beam form;
  a second optical element configured to guide the light beam to an optical deflector; and
  a third optical element configured to focus the light beam deflected by the optical deflector into an optical spot on a scanned surface and configured to optically scan the scanned surface,
  wherein the semiconductor laser light source and the first optical element are fixed on a single continuous member, and the first optical element or the second optical element is a diffraction optical element,
  the diffraction optical element having a diffracting surface in which a plurality of elliptical grooves is formed, the diffracting surface having a diffracting portion power such that a change in a beam waist position in a main scan direction and in a sub-scan direction due to temperature variation in the optical scanning apparatus becomes substantially zero,
  wherein the member on which the semiconductor laser light source and the first optical element are fixed has a linear coefficient of expansion such that the change in the beam waist position becomes substantially zero even when there is temperature variation, and
  wherein a long-axis of the elliptical grooves is horizontally arranged so as to correspond to the main scan direction, and a short-axis of the elliptical grooves is vertically arranged so as to correspond to the sub-scan direction.

2. The optical scanning apparatus according to claim 1, wherein the diffraction optical element has an anamorphic refracting surface formed on a surface opposite to the diffracting surface.

3. The optical scanning apparatus according to claim 1, wherein the diffracting surface of the diffraction optical element has multiple steps of which a total power of a diffracting portion power and a refracting portion power is zero.

4. The optical scanning apparatus according to claim 1, wherein the diffraction optical element is the second optical element.

5. The optical scanning apparatus according to claim 4, wherein the second optical element is made of resin.

6. The optical scanning apparatus according to claim 1, wherein the first optical element is made of resin.

7. The optical scanning apparatus according to claim 1, wherein the first optical element is the diffraction optical element, and wherein the first optical element includes the function of the second optical element.

8. The optical scanning apparatus according to claim 7, wherein the first optical element has an anamorphic refracting surface on a side opposite to the diffracting surface.

9. The optical scanning apparatus according to claim 7, wherein the diffracting surface of the first optical element has multiple steps of which a total power of a diffracting portion power and a refracting portion power is zero.

10. The optical scanning apparatus according to claim 7, wherein the first optical element is made of resin.

11. An image forming apparatus comprising one or more image forming units configured to optically scan a photosensitive image carrier using an optical scan unit in order to form a latent image that is developed by an developing unit into a visible image, wherein: the optical scan unit comprises the optical scanning apparatus according to claim 1.

* * * * *